United States Patent [19]
Menioux

[11] Patent Number: 5,269,134
[45] Date of Patent: Dec. 14, 1993

[54] VARIABLE CYCLE PROPULSION UNIT FOR AIRCRAFT

[75] Inventor: Claude C. F. Menioux, Nogent, France

[73] Assignee: Societe Nationale d'Etude et de Construction de Moteurs d'Aviation "S.N.E.C.M.A.", Paris, France

[21] Appl. No.: 51,168

[22] Filed: Apr. 22, 1993

[30] Foreign Application Priority Data

Apr. 30, 1992 [FR] France ............... 92 05350

[51] Int. Cl.⁵ .......................................... F02K 3/00
[52] U.S. Cl. ................................. 60/224; 60/262; 60/39.15
[58] Field of Search .......... 60/39.15, 224, 262, 60/263, 39.163, 226.1

[56] References Cited

U.S. PATENT DOCUMENTS

| | | | |
|---|---|---|---|
| 2,409,177 | 10/1946 | Allen et al. | 60/226.1 |
| 2,750,738 | 6/1956 | Barrett et al. | 60/39.15 |
| 2,840,987 | 7/1958 | Bloomberg et al. | 60/39.15 |
| 3,143,381 | 8/1964 | Dornier et al. | 60/226.1 |
| 3,154,915 | 11/1964 | Eichholtz | 60/263 |
| 3,173,628 | 3/1965 | Marchant et al. | 60/224 |
| 3,368,346 | 2/1968 | Warne | 60/39.15 |
| 3,388,878 | 6/1968 | Peterson et al. | 60/224 |
| 3,585,795 | 6/1971 | Grieb | 60/39.163 |
| 3,841,091 | 10/1974 | Sargisson et al. | 60/224 |
| 4,054,030 | 10/1977 | Pedersen | 60/262 |
| 4,147,024 | 4/1979 | Moellmann | 60/39.15 |

FOREIGN PATENT DOCUMENTS 1288767 2/1962 France .

*Primary Examiner*—Richard A. Bertsch
*Assistant Examiner*—Timothy S. Thorpe
*Attorney, Agent, or Firm*—Oblon, Spivak, McClelland, Maier & Neustadt

[57] ABSTRACT

A variable cycle propulsion unit comprises at least two turbojet engines of the bypass type in which the low pressure compressor of each engine is in two parts connected by a shaft, and the flow of compressed air issuing from the first part of the low pressure compressor of a first of the engines is supplied to the second part of the low pressure compressor of a second of the engines and the flow of compressed air issuing from the first part of the low pressure compressor of the second engine is supplied to the second part of the low pressure compressor of the first engine. At full throttle operation the combustion chambers of the two engines are both ignited, and at operation at reduced engine speeds the combustion chamber of one of the engines is extinguished and the engine windmills while the other engine continues to run normally.

8 Claims, 2 Drawing Sheets

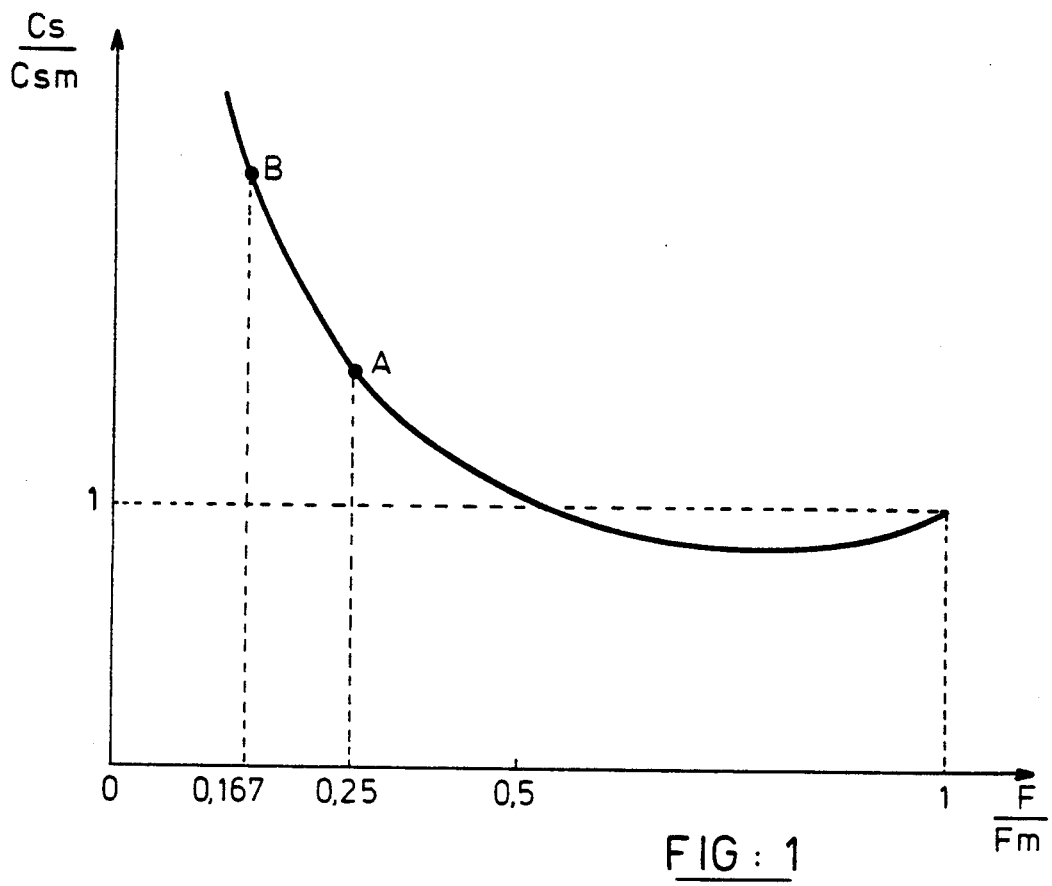
FIG: 1
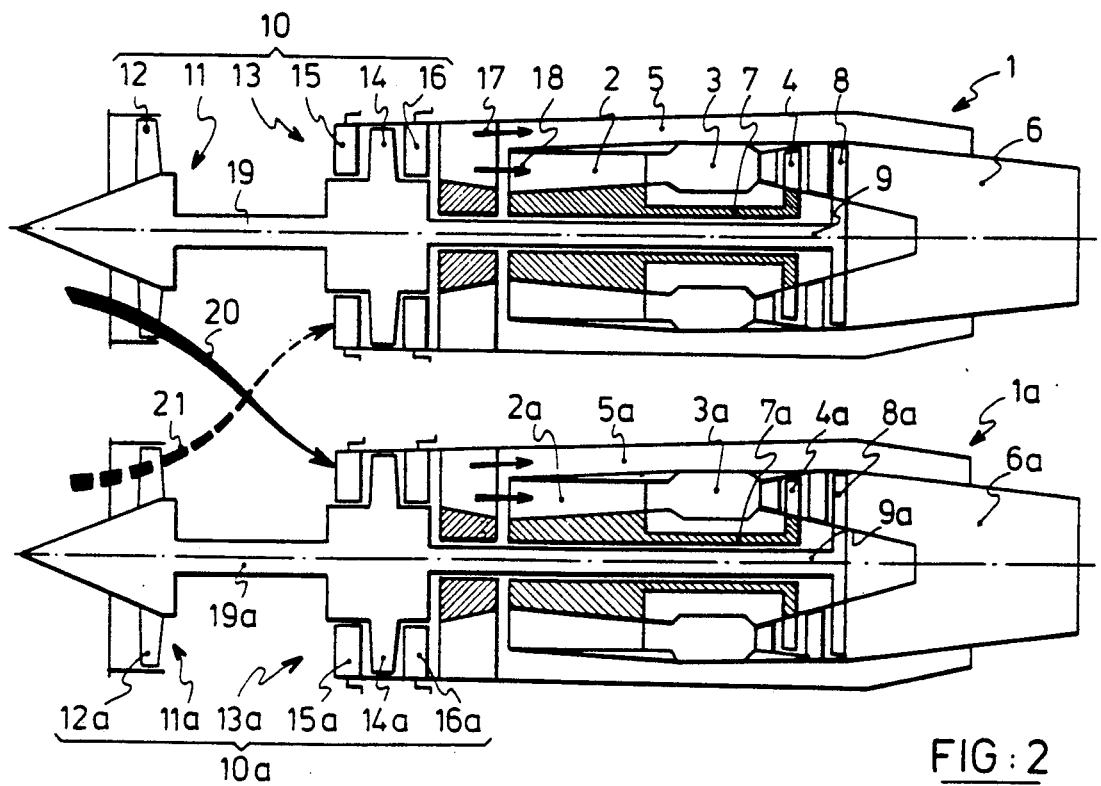
FIG: 2

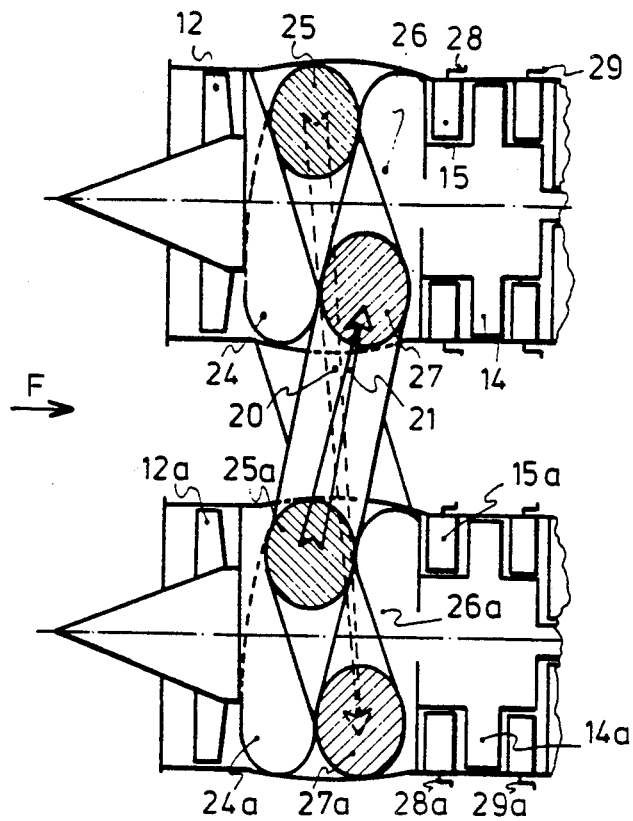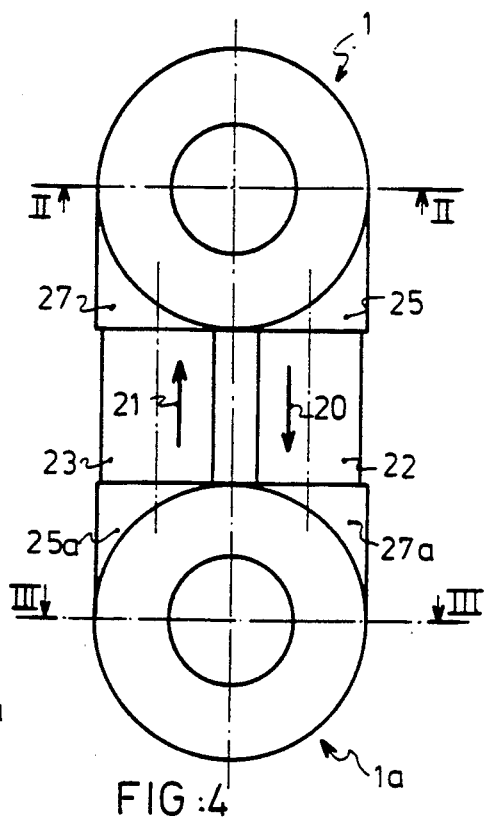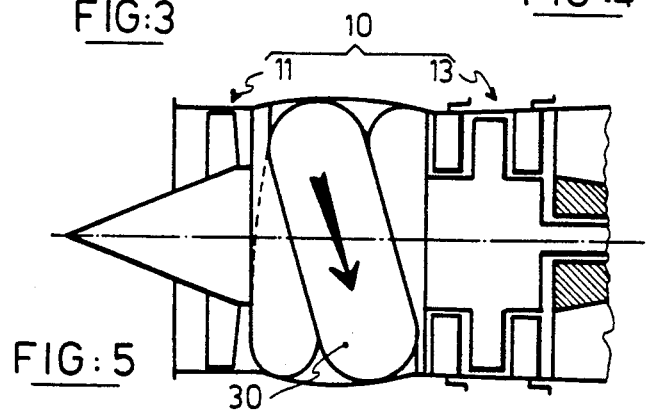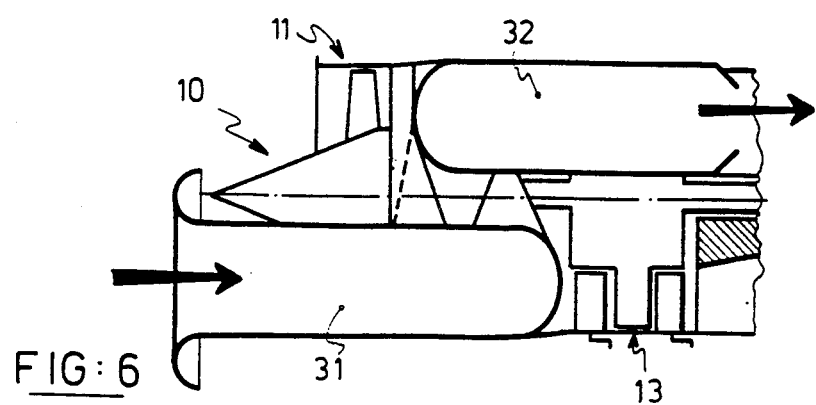

VARIABLE CYCLE PROPULSION UNIT FOR AIRCRAFT

FIELD OF THE INVENTION

The present invention relates to a variable cycle propulsion unit, particularly for a military fighter aircraft, as well as to an advantageous method of operating the unit.

BACKGROUND OF THE INVENTION

One development in modern fighter aircraft is a tendency to increase the installed power. Indeed, manoeuvrability requirements necessitate the provision of highly powered aircraft. The search to reduce the infrared radiation of aircraft without reducing performance leads to an increase in installed power without afterburn. This is also a consequence of the search for versatility, such as in STOL/VTOL applications.

The outcome, for a given technological development level, is an increase of engine mass which imposes a reduction of overall fuel capacity of up to 20 to 25% in order to keep constant the total mass of the aircraft on take-off.

In the known engines used nowadays, of the bypass turbojet type, suppressing the after-burn makes it possible to obtain, when operating at full throttle, a substantial reduction in fuel consumption which may exceed 100%, but, at constant cruising thrust, the specific fuel consumption increases with the size of engine.

A representation is given in FIG. 1 of the attached drawings, of a curve showing the variation of the ratio Cs/Csm (as ordinate) of the specific consumption at partial throttle and full throttle as a function of the ratio F/Fm (as abscissa) of the corresponding thrusts at partial throttle and maximum throttle. On this curve, point A corresponds to an engine equipped with after-burn, and point B to an engine without after-burn supplying the same thrust on take-off, and therefore of greater size. It will be observed that for an increase of engine size enabling an increase of thrust ΔF/F of 50% to be obtained, the corresponding increase of specific consumption when cruising ΔCs/Cs is 26.5%.

Indeed, from the analyses carried out the following requirements appear difficult to reconcile, namely:

to obtain a powerful thrust at full throttle, it is necessary to operate with a low bypass ratio and to use an engine with a large high pressure body;

whereas, to obtain a low fuel consumption when cruising, it is necessary to operate with a high bypass ratio and to use an engine with a small high pressure body.

SUMMARY OF THE INVENTION

It is thus an object of the invention to provide a propulsion unit which meets these requirements without suffering from the drawbacks of the currently known variable cycle engines.

To this end, according to the invention there is provided a variable cycle propulsion unit of the turbojet type, particularly for a military fighter aircraft, comprising at least two base engines of the bypass type, each of said base engines including, from upstream to downstream relative to the normal direction of flow of gases in the engine, a low pressure compressor, a high pressure compressor, a combustion chamber, at least one turbine driving said compressors, and an ejection nozzle assembly, wherein said low pressure compressor of each of said base engines comprises a first part including a first stage of rotor blades, a second part including at least one second stage of rotor blades, an inlet stage of fixed guide vanes preceding said at least one second stage of rotor blades, and an outlet stage of fixed guide vanes following said at least one second stage of rotor blades, and a shaft interconnecting said first and second stages of rotor blades, and wherein said propulsion unit includes first means for delivering the compressed air provided by said first part of said low pressure compressor of a first of said base engines to said second part of said low pressure compressor of a second of said base engines, and second means for delivering the compressed air provided by said first part of said low pressure compressor of said second base engine to said second part of said low pressure compressor of said first base engine, thereby effecting a permanent cross-over of the flows between said first and second base engines of said propulsion unit.

Preferably, each of said first and second means comprises a first toric volute for receiving directly the compressed air delivered by said first part of said low pressure compressor of the respective one of said first and second base engines, a second toric volute preceding said second part of said low pressure compressor of the other of said first and second base engines, and a duct connecting said first toric volute to said second toric volute. By arranging for a simple pivotal movement of the assembly of volutes through 180° about the engine axis, the two engines may be made identical and will accordingly be interchangeable.

The invention also provides a method of operating the propulsion unit wherein, at full throttle, said combustion chambers of said first and second base engines are ignited and operate the respective high pressure bodies, corresponding to operation of a large high pressure body with a low bypass ratio, and, at reduced throttle, said first engine is stopped and its combustion chamber extinguished, while said second engine continues to operate normally with said first part of said low pressure compressor of said second engine delivering air to said first engine and causing said first engine to windmill, corresponding to operation of a small high pressure body with a high bypass ratio.

Other preferred features and advantages of the invention will become apparent from the following description of a preferred embodiment of the invention, given by way of example, with reference to the attached drawings.

BRIEF DESCRIPTION OF THE DRAWINGS

FIG. 1, as mentioned earlier, is a plot showing a curve representing the variation of the ratio of the specific fuel consumptions of an engine at partial throttle and at maximum throttle (Cs/Csm) as a function of the corresponding thrust ratio of the engine at partial throttle and at maximum throttle (F/Fm).

FIG. 2 is a diagrammatic sectional view, taken in a plane passing through the longitudinal axes of rotation of the engines, of an embodiment of a propulsion unit in accordance with the invention and comprising two base engines in association with each other.

FIG. 3 is a diagrammatic view of the front part of the propulsion unit of FIG. 2 showing the cross-over connections between the low pressure compressors of the two engines, the view of one of the engines being taken on the line II-II of FIG. 4 and the view of the other engine being taken on the line III-III of FIG. 4.

FIG. 4 is a diagrammatic front elevation of the propulsion unit looking in the direction of the arrow F of FIG. 3.

FIG. 5 is a diagrammatic view of the front part of one of the engines of the propulsion unit showing a modification introduced to carry out a first development test simulating operation of the engine at maximum throttle.

FIG. 6 is a diagrammatic view similar to that of FIG. 5 but showing a modification introduced to carry out a second development test simulating operation of the engine at partial throttle.

DESCRIPTION OF THE PREFERRED EMBODIMENT

A propulsion unit in accordance with the invention and intended for a military fighter aircraft is formed by an even number of base engines associated in pairs. In the embodiment represented in FIGS. 2 to 4, the propulsion unit is formed of two associated base engines. Each engine is a turbojet engine of the bypass type. A first engine 1 thus includes, in a known and conventional manner, a high pressure primary unit comprising a high pressure compressor 2, a combustion chamber 3 and a high pressure turbine 4, and, in a similar manner, the second engine 1a comprises a high pressure compressor 2a, a combustion chamber 3a and a high pressure turbine 4a. This primary unit of each engine is surrounded by an annular secondary duct 5, 5a respectively, termed the "cold flow duct", and each engine comprises at its downstream end (upstream and downstream or front and back being defined relative to the normal direction of the flow of gases through the engine) an ejection nozzle assembly 6, 6a which is of known construction and which is not shown in detail in the drawings.

The turbojet engines may be of the single spool type, or, as in the example shown in the drawings, of the twin spool type. In the latter case, as is diagrammatically shown in FIG. 2, the high pressure compressor 2 or 2a and the high pressure turbine 4 or 4a are connected by means of a shaft 7 or 7a, in each engine. A low pressure spool is driven by a low pressure turbine 8 or 8a connected by means of a shaft 9 or 9a to a low pressure compressor 10 or 10a. As mentioned earlier, it is desirable for military aircraft to avoid an increase of infrared radiation, and accordingly the propulsion unit of the invention is preferably not provided with an afterburner system. However, provided it is not too substantial, an after-burner of known construction may be included in the propulsion unit of the invention if desired.

An essential feature of the invention resides in the construction of the low pressure compressors 10 and 10a of the base engines of the propulsion unit. Each low pressure compressor 10, 10a is made in two parts. A first part 11, 11a is composed of the front part of the rotary assembly and comprises a first stage 12, 12a of rotor blades, and the second part 13, 13a comprises at least one second stage 14, 14a of rotor blades preceded by a stage 15, 15a of fixed vanes forming an inlet guide and followed by a stage 16, 16a of fixed vanes forming an exit guide. A part of the air flow thus compressed, symbolized by the arrow 17, is supplied to the secondary duct 5 before being ejected, and another part of the compressed air flow, symbolized by the arrow 18, is supplied to the high pressure compressor 2 and the corresponding primary unit.

The two parts 11, 11a and 13, 13a of each low pressure compressor are spaced apart axially, and the hubs of the first and second stages of rotor blades 12, 12a and 14, 14a are connected by a shaft 19, 19a. The interconnection of the two base engines 1 and 1a forming the propulsion unit is effected at the level of the low pressure compressors 10 and 10a by a permanent crossing-over of their respective flows. Thus, the air flow, symbolized by the arrow 20, compressed by the first part 11 of the low pressure compressor 10 of the first engine 1 is conducted to the inlet of the second part 13a of the low pressure compressor 10a of the second engine 1a and, in accordance with the symmetrical arrangement chosen for the two engines, the air flow, symbolized by the arrow 21, compressed by the first part 11a of the low pressure compressor 10a of the second engine 1a is conducted to the inlet of the second part 13 of the low pressure compressor 10 of the first engine 1.

As shown by FIGS. 3 and 4, in this embodiment the said air flows 20 and 21 are guided by two ducts 22 and 23 respectively. The first parts 11, 11a of the low pressure compressors 10, 10a each deliver into a respective toric volute 24, 24a which collects the whole of the flow and channels it to an outlet opening, which, in the case of the first engine 1 (i.e. the right hand engine when looking at the propulsion unit from the rear), is an opening 25 situated on the left and at the top of the engine, and in the case of the left hand engine 1a is an opening 25a situated to the right and at the bottom of the engine. The second parts 13, 13a of the low pressure compressors are each served by a supply volute 26, 26a situated upstream of the inlet guide 15, 15a and having an intake opening 27, 27a. In the case of the first (or right hand) engine 1, this opening 27 is situated on the left and at the bottom of the engine, and is connected by means of the said duct 23 to the outlet opening 25a of the volute 24a of the second engine 1a. In the case of the second (or left hand) engine 1a, the intake opening 27a is situated on the right and at the top of the engine, and is connected by the said duct 22 to the outlet opening 25 of the first engine 1. The two ducts 22 and 23 are designed so that they can be removed, and are preferably made from a flexible material. The unit formed by the two volutes 24 and 26 of the right engine 1 is identical with that formed by the two volutes 24a and 26a of the left engine 1a, and the effective conversion of the right engine into a left engine, and vice versa may be obtained simply by pivoting the entire assembly of volutes through 180° around the axis of the propulsion unit.

The propulsion unit which has just been described with reference to FIG. 2 to 4 makes it possible to achieve the aims of the invention and the advantages mentioned earlier, particularly on applying the principle of operation or the modus operandi in accordance with the invention which is described below.

Two principal operating modes of the propulsion unit are used. Firstly, when operating at full throttle, the two associated engines 1 and 1a operate as conventional bypass turbojet engines. Each high pressure compressor 2, 2a is supplied by the second part of the corresponding low pressure compressor 10, 10a and supplies the combustion chamber 3, 3a which is ignited and despatches the burnt gases through the turbines 4, 4a and 8, 8a to the ejection nozzle 6, 6a. Recourse is had to this mode of operation each time a powerful thrust is required, such as on take-off or in combat. The propulsion unit can in this case be regarded as equivalent to a single engine having the characteristics of a low bypass ratio and a large high pressure body or spool.

Secondly, when operating at reduced throttle, such as during escort flights or in cruising or waiting phases, one of the two engines, for example the first engine 1, is shut down and its combustion chamber 3 extinguished, while the second engine 1a continues to be operated normally as described above. In this case, the first part 11a of the low pressure compressor 10a of the second engine 1a continues to supply the second part 13 of the low pressure compressor 10 of the first engine 1, which thus delivers a cold flow causing the first engine to windmill. The first part 11 of the low pressure compressor 10 of the first engine 1 thus windmills and continues to supply the second part 13a of the low pressure compressor 10a of the second engine 1a as well as its primary body.

In order to ensure the compatibility of the flow rates between the first parts 11 and 11a and the second parts 13 and 13a of the low pressure compressors 10 and 10a, a device 28, 28a and 29, 29a for adjusting the pitch of the fixed blades is provided in a known manner on each guide stage 15, 15a and 16, 16a respectively of the low pressure compressors 10 and 10a. Alternatively, a discharge device of known construction may be used to regulate the flows of the low pressure compressors 10 and 10a.

In this second operating mode the propulsion unit may be regarded as equivalent to a single engine having the characteristics of a high bypass ratio and a small high pressure body or spool, as its size is effectively reduced by half relative to the first operating mode. This method of operation permits, in particular, the achievement of a lower compression ratio at low pressure, a higher bypass ratio and a lower overall compression ratio. This, in turn, achieves one of the objectives sought, namely the lowering of the specific fuel consumption level. Depending on the type of engine, with or without after-burner, taken as a basis for comparison, the gains in specific consumption obtained may range from 25 to 30% up to 40 or 45%.

A further advantage of the propulsion unit which is the subject of the present invention is that it is not essential to couple the two engines to carry out development tests on the propulsion unit. A few slight modifications will suffice to achieve, from one engine only, a simulation of operation on full throttle, or a simulation of operation at reduced throttle. For this purpose, as shown diagrammatically in FIG. 5, operation at full throttle can be effected by mounting a connecting duct 30 between the outlet of the first part 11 and the inlet of the second part 13 of the low pressure compressor 10 of the engine selected for the tests. Alternatively, as shown diagrammatically in FIG. 6, to simulate operation at low throttle, a first adaptor 31 is mounted at the inlet of the second part 13 of the low pressure compressor 10 to provide the supply of air and simulate a loss of head equivalent to that resulting from the first compressor stage, and a second adaptator 32 is mounted at the outlet of the first part 11 of the low pressure compressor 10 to simulate the loss of head corresponding to flow in the second engine.

I claim:

1. A variable cycle propulsion unit of the turbojet type, particularly for a military fighter aircraft, comprising at least two base engines of the bypass type, each of said base engines including, from upstream to downstream relative to the normal direction of flow of gases in the engine, a low pressure compressor, a high pressure compressor, a combustion chamber, at least one turbine driving said compressors, and an ejection nozzle assembly, wherein said low pressure compressor of each of said base engines comprises a first part including a first stage of rotor blades, a second part including at least one second stage of rotor blades, an inlet stage of fixed guide vanes preceding said at least one second stage of rotor blades, and an outlet stage of fixed guide vanes following said at least one second stage of rotor blades, and a shaft interconnecting said first and second stages of rotor blades, and wherein said propulsion unit includes first means for delivering the compressed air provided by said first part of said low pressure compressor of a first of said base engines to said second part of said low pressure compressor of a second of said base engines, and second means for delivering the compressed air provided by said first part of said low pressure compressor of said second base engine to said second part of said low pressure compressor of said first base engine, thereby effecting a permanent cross-over of the flows between said first and second base engines of said propulsion unit.

2. A propulsion unit according to claim 1, wherein each of said first and second means comprises a first toric volute for receiving directly the compressed air delivered by said first part of said low pressure compressor of the respective one of said first and second base engines, a second toric volute preceding said second part of said low pressure compressor of the other of said first and second base engines, and a duct connecting said first toric volute to said second toric volute.

3. A propulsion unit according to claim 2, wherein said first and second base engines respectively form right and left engines of said propulsion unit when looking from the rear toward the front of said unit, said duct connecting said first volute of said right engine to said second volute of said left engine leads from the top left of said first volute to the top right of said second volute, and said duct connecting said first volute of said left engine to said second volute of said right engine leads from the bottom right of said first volute to the bottom left of said second volute.

4. A propulsion unit according to claim 2, wherein said ducts of said first and second means are flexible and removable.

5. A propulsion unit according to claim 3, wherein said right and left engines are identical, and are effectively interchangeable by a simple pivotal movement of the assembly of said volutes of said low pressure compressors through 180° about the engine axis.

6. A propulsion unit according to claim 1, wherein said inlet and outlet stages of fixed guide vanes of said second part of said low pressure compressor of each of said base engines are provided with a means for adjusting the angular setting of said guide vanes.

7. A propulsion unit according to claim 1, wherein said second part of said low pressure compressor of each of said base engines is provided with a discharge device of adjustable flow so as to ensure compatibility between the respective flows of said first and second parts of said low pressure compressors at all engine speeds.

8. A method of operating a propulsion unit according to claim 1, wherein, at full throttle, said combustion chambers of said first and second base engines are ignited and operate the respective high pressure bodies, corresponding to operation of a large high pressure body with a low bypass ratio, and, at reduced throttle, said first engine is stopped and its combustion chamber extinguished, while said second engine continues to operate normally with said first part of said low pressure compressor of said second engine delivering air to said first engine and causing said first engine to windmill, corresponding to operation of a small high pressure body with a high bypass ratio.

* * * * *